Oct. 11, 1949.   C. J. STUBAU   2,484,321
PUMP COUPLING
Filed Nov. 5, 1945

Inventor:
Carl J. Stubau
By Edward C. Fritzbaugh
Atty.

Patented Oct. 11, 1949

2,484,321

UNITED STATES PATENT OFFICE 2,484,321

PUMP COUPLING

Carl J. Stubau, Cleveland, Ohio, assignor, by mesne assignments, to Borg-Warner Corporation, Chicago, Ill., a corporation of Illinois Application November 5, 1945, Serial No. 626,767

2 Claims. (Cl. 64—27)

1

This invention relates to shaft couplings and particularly to resilient shaft couplings adapted to absorb vibrations or impulses ordinarily transmitted between the driving and driven shafts.

It is an object of the present invention to provide in a resilient shaft coupling, which transmits torque between a driving and driven member through the use of resilient means drivingly positioned between aligned lugs of said two members, an improved driving member so constructed that it will transmit torque to the resilient means in a manner to effect even distribution of stresses therein. A further object in this connection is to effect such an even distribution of stresses from the initial instant that torque is transmitted to the resilient means.

It is a further object of this invention to provide an improved bearing relation between the driving and driven members thereby extending the life of the coupling.

It is another object of my invention to provide a driving member and an associated ring member which have aligned driving lugs maintained against relative rotational movement for cooperation in providing an improved unitary drive mechanism.

It is still another object of my invention to provide a lubricant retaining housing surrounding and out of contact with the driving member, the driven member and the resilient torque transmitting means, which housing also serves to maintain said members and means in fixed axial relation relative to each other.

Figure 1:
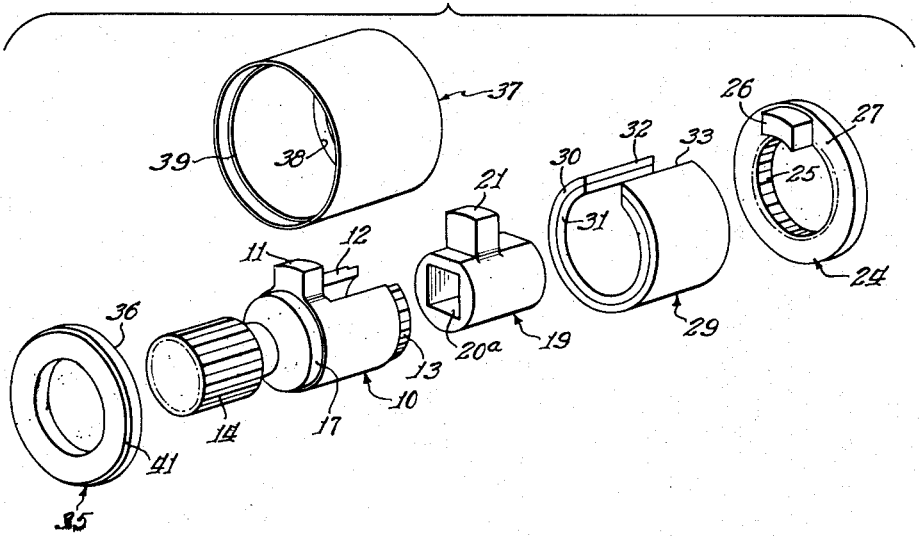
Figure 2:
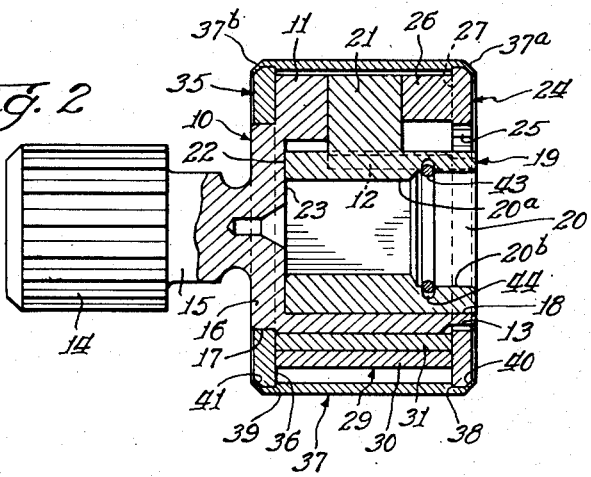

Other objects and advantages of my invention will appear from the following detailed description when taken in connection with the appended drawing in which:

Fig. 1 shows an "exploded" perspective view of the component parts of the coupling; and Fig. 2 is a vertical cross-section of the coupling, partially in elevation, showing the component parts of the coupling in assembled relation.

Referring now to the figures of the drawing, a generally tubular driving member 10 has a radially extending driving lug 11 and a slot 12 extending axially from adjacent lug 11 to the end of the tubular member, which end bears external splines 13. An externally splined shaft 14 adapted to be connected to a driving shaft (not shown) is joined to the tubular driving member 10 by means of a reduced neck portion 15 and a flanged portion 16 which provides an external shoulder 17 and serves to close off one end of tubular driving member 10. The inner surface 18 of member

2

10 is finished in such a manner as to permit it to serve as a bearing surface.

A driven member 19 having a shaft receiving socket 20 has a bearing fit within the tubular driving member 10. This driven member is shown as being substantially tubular by reason of the reduced portion 20a of the socket 20 and the enlarged portion 20b together defining a passageway through the driven member 19. However, this member 19 will generally be referred to as "cylindrical" to differentiate it from tubular driving member 10, but such designation will be understood to mean either a hollow cylinder or tube, as shown, or a solid cylinder having a socket extending part way therein. Lubricant may be placed in the socket 20. A driving lug 21 on said cylindrical driven member 19 extends radially outwardly with lateral clearance through the slot 12 in the driving member 10. The driving lugs 11 and 21 are substantially axially and radially aligned and in abutting relationship. The end 22 of the cylindrical driven member 19 abuts against the inner side 23 of the flange 16 on the driving member 10. The full length of the cylindrical driven member 19 finds its bearing in the inner surface 18 of the tubular drive member 10 and is adapted to have slight arcuate movement with respect to the member 10 by reason of the slot 12 being wider than the driving lug 21 of the cylindrical driven member 19.

Whenever reference is herein made to the "driving member" and the "driven member," it will be appreciated that this will designate only the general relationship between said two members since, under certain circumstances, the driving member will become a driven member, while the driven member will become a driving member. Such designation of the members is not, therefore, to be considered limiting, but merely a convenient method of description.

A drive ring member 24 has internal splines 25 which are adapted to mate with the external splines 13 of the driving member so that the ring member 24 and driving member 10 will rotate together as a unit without play between the two members. Ring member 24 bears a driving lug 26 extending from its inner face 27, which lug is positioned axially and radially in alignment with the driving lug 11 of the driving member 10. When the ring member 24 is properly secured to the tubular driving member 10 the driving lug 26 is in abutting relationship with one side of the driving lug 21 of the cylindrical driven member 19.

A resilient member 29 comprising a pair of concentric, split spring-rings 30 and 31 is adapted to be positioned around the tubular driving member 10 in such a manner that the opposed faces 32 and 33 formed where rings 30 and 31 are split, will engage the sides of the three lugs 11, 21 and 26 to resiliently interconnect the driving and driven members. It will be understood, of course, that one split spring ring, or more than two of such rings, could be employed if desired.

A retainer ring member 35 is adapted to be positioned on the shoulder 17 of the tubular driving element 10. The retainer ring 35 and the ring member 24 have peripheries which are spaced radially outwardly an equal amount from the peripheries of the driving and driven members and the spring member 29 and beyond the driving lugs 11, 21 and 26.

A housing member 37, tubular in shape, has its end portions 37a and 37b internally reduced to form shoulders 38 and 39. The inner face 36 and the inner face 27 of the retainer ring 35 and ring member 24, respectively, engage the shoulders 39 and 38, respectively, and are thereby axially spaced apart. To complete the assembly of the resilient coupling the reduced end portions 37a and 37b of the housing 37 are rolled over the beveled edges 40 and 41 of the ring member 24 and retainer ring 35, respectively. This cooperation between the cylindrical housing 37 and the retainer ring 35 and ring member 24 positions the component parts of the coupling in substantially fixed axial position relative to one another and also serves to retain lubricant within the coupling.

The socket 20 in the cylindrical driving member 19 has a reduced portion 20a which is squared or otherwise formed in cross-section to engage the end of a complementary driven shaft (not shown) having a similar cross-section. A split ring 43 positioned in a groove 44 in the enlarged portion 20b of the socket 20 may serve in conjunction with a similar groove in a shaft (not shown) which is adapted to fit within said socket to prevent undesired axial shifting between the socket and the shaft.

In the operation of this resilient coupling, torque is supplied to the tubular driving member 10 through its connection, by splined shaft 14, with some driving member. Driving lug 11 on the driving member 10 and driving lug 26 on the ring member 24 together impress this torque upon the resilient member 29 which in turn transmits the torque to the driving lug 21 of the cylindrical member 19. The split spring rings 30 and 31, by their ability to spread apart, overcome the inertia of the cylindrical driven member 19 and transmit torque thereto in an even manner and without any sudden jolting. The cylindrical driven member then transmits the torque to such member as is fitted within its socket 20. The degree of resiliency of the split spring rings 30 and 31 is such that, upon the application of a maximum initial torque, the spring rings prevent the driving lug 21 of the driven member 19 from engaging either edge of slot 12 in the tubular driving member 10. However, the construction of the coupling is such that, should the resilient member 29 fail to operate, positive drive may be transmitted from the tubular driving member 10 to the cylindrical driven member 19 by one or the other of the edges of the slot 12 engaging the adjacent side of lug 21 on the driven member.

Since the driven member 19 finds its entire bearing wholly within the tubular driving member 10 the life of the coupling is greatly increased over that of a coupling which employs two axially separated bearings for the driven member, which bearings have a tendency to get out of alignment.

While providing such uninterrupted bearing surface for the driven member 19, my construction also permits even distribution of stresses upon the spring member 29 when torque is applied by the driving member 10. This is made possible by the employment with the driving member 10 of an internally splined ring member 24 having a driving lug 26 which member, when properly located on the externally splined end of the driving member 10, provides a unitary driving mechanism, with no play between the driving lugs, for equally loading the end portions of the resilient member 29.

While I have disclosed my invention in connection with a specific embodiment thereof, it will be understood that the scope of the invention is not to be limited thereto but is to be determined by the appended claims.

I claim:

1. In a resilient coupling, in combination, a generally elongated tubular member having a radially extending lug at one end thereof and having an axially extending slot aligned with said lug and extending from said lug to the other end of said tubular member, said other end having external splines; an elongated cylindrical member received in said tubular member and engaging said tubular member for substantially the full length of said cylindrical member and having a lug extending radially outwardly with circumferential clearance through the slot in said tubular member, said lug being substantially aligned with the lug on the tubular member; a drive ring member on said other end of the tubular member having internal splines which mate with the external splines of the tubular member, said drive ring member also having an axially extending lug adapted to be positioned in axial alignment with the lug on the tubular member and to be maintained in said position of alignment by said splines; a retainer ring member abutting said one end of the tubular member; a split spring ring member disposed between said drive and retainer ring members embracing said tubular member and having its split ends engaging all of said legs, whereby torque may be resiliently transmitted between the tubular member and drive ring, and the cylindrical member; and a cylindrical housing radially spaced from said tubular member, cylindrical member, and spring ring member, respectively, and gripping the outer peripheries of the drive and retainer ring members to maintain the component parts of the resilient coupling in fixed axial position relative to each other.

2. A resilient coupling, comprising: an elongated tubular member having a radially extending lug at one end thereof and an axially extending slot in the side wall thereof aligned with said lug and extending from said lug to the other end of said tubular member, said one end of said tubular member being closed by an end wall and having a shaft projecting axially from the outer side of said end wall; an elongated cylindrical member received in said tubular member and being engaged with and supported by said tubular member for substantially the full length of said cylindrical member, said cylindrical member having a lug extending radially outwardly therefrom through the slot in said tubular member, said slot being wider than said last-mentioned lug to provide lateral clearance between said lug and the sides of said slot, said last-mentioned lug normally confronting and being substantially axially aligned with the lug on said tubular member, said cylindrical member also having a socket for the reception of a torque transmitting member; a drive ring surrounding said other end of said tubular member, said drive ring having an axially extending lug on the inner side thereof confronting the lug on said cylindrical member and being adapted to be disposed in predetermined axial alignment with the lug on said tubular member; means restraining said drive ring from rotating relative to said tubular member to thereby maintain the lug on said tubular member and on said drive ring in predetermined axial alignment; a retainer ring abutting the closed end of said tubular member; a split spring ring member disposed between said drive and retainer rings and embracing said tubular member and having its split ends engaging the sides of all of said lugs, whereby torque may be resiliently transmitted between said tubular member and said drive ring, and said cylindrical member; and a cylindrical housing surrounding and being radially spaced from said tubular member, cylindrical member, and spring ring member, respectively, and gripping the outer peripheries of said drive and retainer rings to maintain the component parts of the coupling in fixed axial position relative to each other.

CARL J. STUBAU.

REFERENCES CITED

The following references are of record in the file of this patent:

UNITED STATES PATENTS

| Number | Name | Date |
|---|---|---|
| 2,263,113 | Wichorek et al. | Nov. 18, 1941 |
| 2,356,322 | Johnson | Aug. 22, 1944 |